US006725535B2

(12) United States Patent
Edson et al.

(10) Patent No.: US 6,725,535 B2
(45) Date of Patent: Apr. 27, 2004

(54) CLIP APPLICATOR TOOL

(75) Inventors: Wayne Edson, Hollister, MO (US); Mike Gehrke, Strafford, MO (US); Daniel T. Chiles, Springfield, MO (US)

(73) Assignee: Cliptie Corporation, Bois D'Arc, MO (US)

(*) Notice: Subject to any disclaimer, the term of this patent is extended or adjusted under 35 U.S.C. 154(b) by 0 days.

(21) Appl. No.: 10/125,205

(22) Filed: Apr. 17, 2002

(65) Prior Publication Data

US 2003/0196321 A1 Oct. 23, 2003

(51) Int. Cl.[7] .................................................. B23P 19/04

(52) U.S. Cl. .......................... 29/809; 29/811.2; 29/816; 29/243.56; 29/278; 221/238

(58) Field of Search ................................ 29/809, 811.2, 29/816, 818, 243.5, 243.56, 267, 270, 278; 227/136; 221/238, 236, 224

(56) References Cited

U.S. PATENT DOCUMENTS

| | | | | | |
|---|---|---|---|---|---|
| 1,855,645 A | | 4/1932 | McIntosh | | |
| 3,226,882 A | | 1/1966 | Lichtenthaler | | |
| 3,893,647 A | | 7/1975 | Kennedy | | |
| 3,913,187 A | | 10/1975 | Okuda | | |
| 4,456,161 A | * | 6/1984 | Russell | ........................ | 227/67 |
| 4,706,362 A | * | 11/1987 | Strausburg | .................. | 29/432 |
| 4,840,345 A | | 6/1989 | Neil et al. | | |
| 5,020,355 A | * | 6/1991 | Payne et al. | .................. | 72/407 |
| 5,339,983 A | * | 8/1994 | Caple | .......................... | 221/25 |
| 5,367,750 A | | 11/1994 | Ward | | |
| 5,819,374 A | | 10/1998 | Chiles et al. | | |
| 5,938,099 A | * | 8/1999 | Ciccarelli | .................... | 227/19 |
| 6,298,549 B1 | * | 10/2001 | Mangone, Jr. | ............... | 29/809 |

* cited by examiner

*Primary Examiner*—David Bryant
*Assistant Examiner*—Jermie E. Cozart
(74) *Attorney, Agent, or Firm*—Shook, Hardy & Bacon L.L.P.

(57) ABSTRACT

A tool for applying clip fasteners which are bent around thin objects to tie them together. The tool has a housing that presents a load opening through which the clip fasteners are loaded. A retractable clip follower is urged by spring action against the fasteners to feed them toward a receiver having a slot for holding the fasteners one at a time. A jaw mechanism operated by a handle is moved toward a fastener held by the receiver and initially bends the fastener about two elbow joints. After a jaw plate carrying the jaws reaches the limit of its motion, continued movement of the jaw mechanism causes the jaws to pivot closed and make a final bend at a center hinge joint of the clip fastener.

5 Claims, 18 Drawing Sheets

CLIP APPLICATOR TOOL

FIELD OF THE INVENTION

This invention relates generally to the application of tie fasteners to thin objects such as in the case of applying radiant tubing to reinforcing bars or reinforcing mesh. More particularly, the invention is directed to an applicator tool for the automated application of clip fasteners and to an assembly of clip fasteners arranged in a substantially flat sheet to facilitate automated application of the fasteners.

BACKGROUND OF THE INVENTION

U.S. Pat. No. 5,819,374 to Chiles et al., discloses a clip fastener that is useful to fasten radiant tubing to reinforcing bars and reinforcing mesh, as well as in other applications that require relatively thin objects to be fastened together. The application of fasteners of this type by hand involves stooping and bending or working on the knees and is thus physically discomforting to the knees, back and other areas of the body. Manual application is also a relatively slow process.

In order to make the use of this type of fastener practical for large scale projects, it is necessary to eliminate the high labor costs, inefficiencies and slow installation rates associated with manual application techniques.

SUMMARY OF THE INVENTION

Accordingly, the present invention is directed to an applicator tool which may be used to automatically apply clip fasteners to thin objects. More particularly, it is an important object of the invention to provide an applicator tool which can be used to apply tie fasteners at ground or floor level while the operator remains in a standing position. This avoids the need for workers to work on their knees or to repeatedly stoop or otherwise assume awkward positions. Use of the applicator tool of the present invention thus makes the process of installing fastening clips simple, expeditious, economical, and physically undemanding.

Another object of the invention is to provide an applicator tool of the character described that is constructed to receive and apply a large number of fasteners in succession. The uniquely arranged fasteners can be manufactured in sheets which can be fed into the machine. The machine can detach the fasteners from the sheet and apply them one at a time. Reloading of the tool is necessary only after a large number of fasteners have been applied.

A further object of the invention is to provide an applicator tool of the character described that is constructed to function reliably over a prolonged operating life.

An additional object of the invention is to provide an applicator tool of the character described that is versatile enough for use in applying tie fasteners to a wide variety of different types of thin objects, including the application of fasteners to fasten radiant heating tubing to reinforcing bars and reinforcing mesh used as reinforcement in concrete construction.

A still further object of the invention is to provide an applicator tool of the character described that has a durable and economical construction.

Yet another object of the invention is to provide a uniquely arranged assembly of fasteners in a sheet which facilitates their automated application to the objects they are to fasten.

Still another object of the invention is to provide a method that allows a human operation to apply the fasteners to radiant tubing and reinforcing bars or wire while the operator remains in a standing position.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
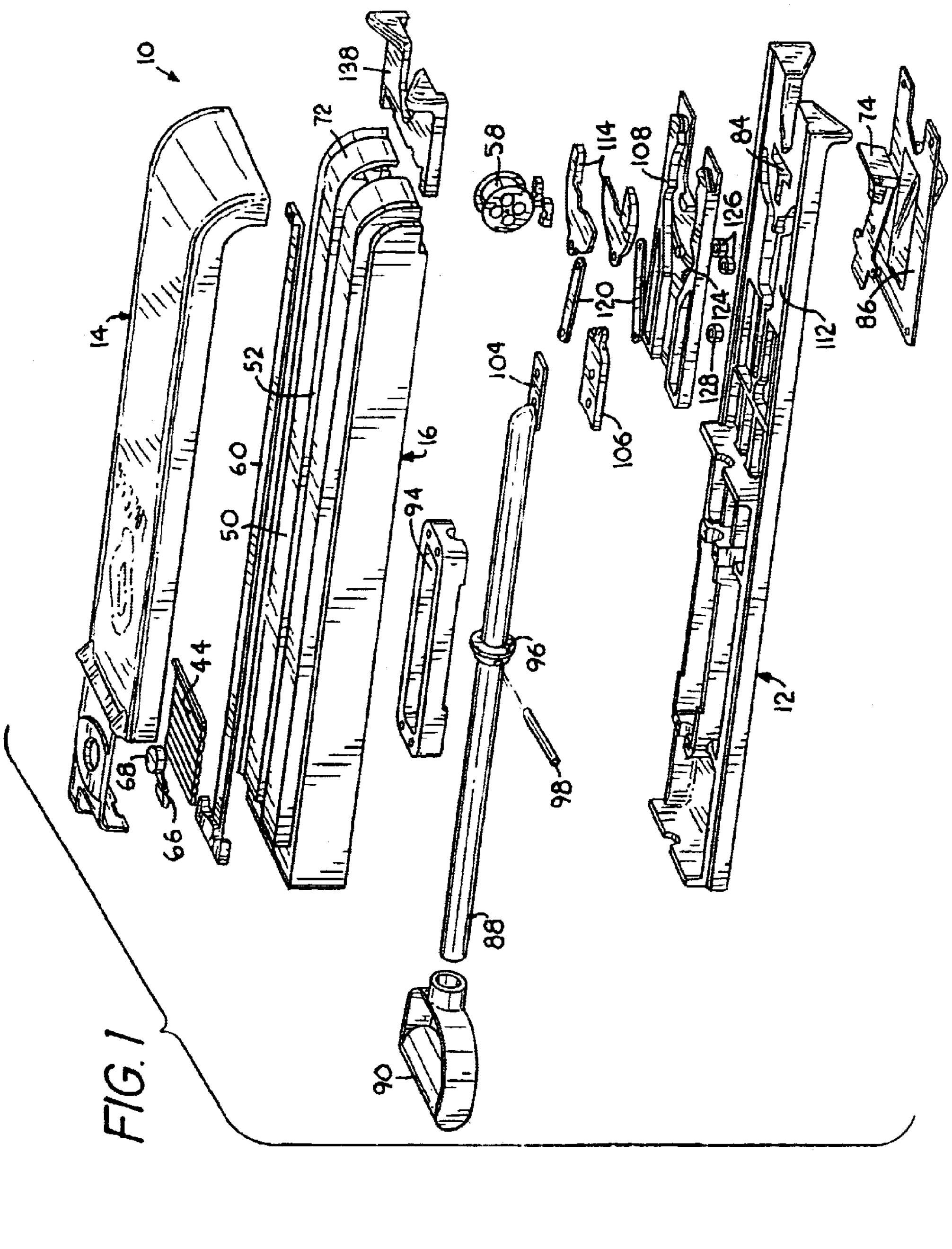
FIG. 1 is an exploded perspective view of an applicator tool constructed according to a preferred embodiment of the present invention and useful in the application of clip fasteners to secure radiant tubing to reinforcing bars and mesh, as well as other thin objects that are to be fastened together.

Referring now to the drawings in more detail, FIG. 1 is an exploded perspective view showing the main components of an applicator tool which is generally identified by numeral 10. The applicator tool 10 has a housing that includes a back 12 and a front cover 14 that are connected to enclose and house the operating components of the applicator tool when it is fully assembled. A center section 16 of the applicator tool is sandwiched between the back 12 and the front cover 14 when they are assembled.

Figure 2:
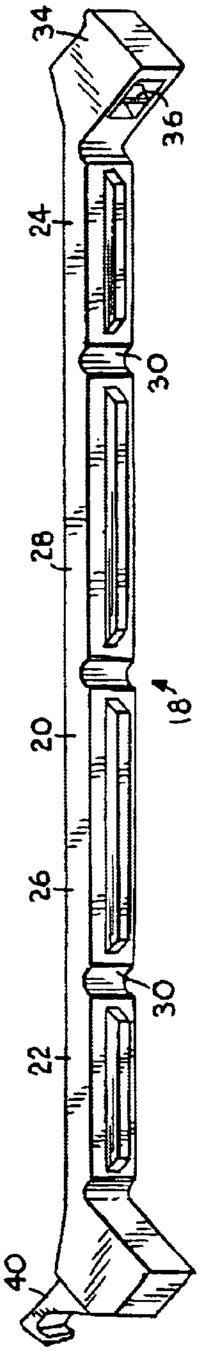
FIG. 2 is a perspective view of a clip fastener of the type that may be applied by the applicator tool of the present invention.
Figure 4:
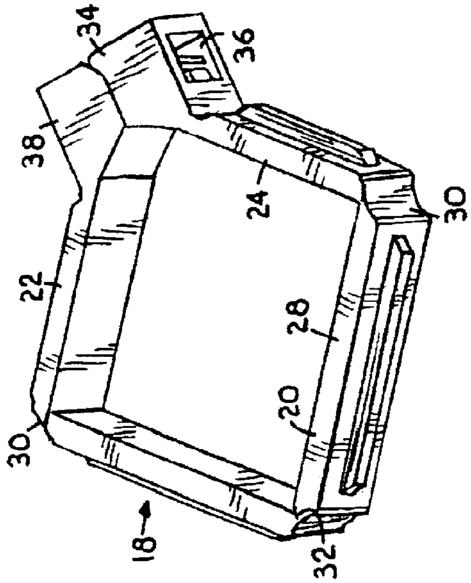
FIG. 4 is a perspective view of the clip fastener shown in FIGS. 2 and 3, with the fastener bent again about its central hinge joint into the general shape of a square and with the opposite ends fastened together.
Figure 3:
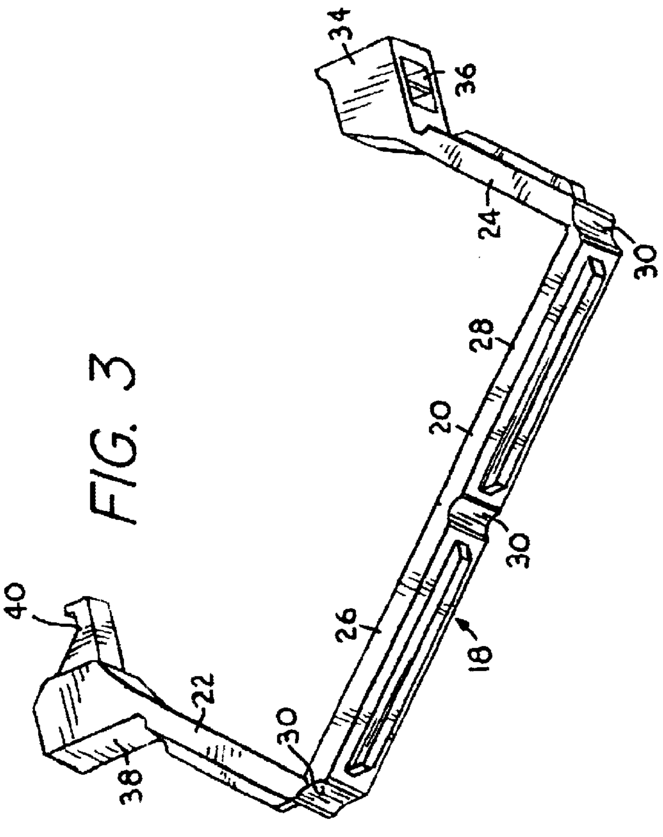
FIG. 3 is a perspective view of the clip fastener shown in FIG. 3 with the two end legs of the fastener body bent from their original undeformed positions.

The applicator tool 10 is used in the application of clip fasteners of the type generally identified by numeral 18 in FIGS. 2–4. The clip fasteners 18 may be used to tie together relatively thin objects such as tying the radiant heating tubes used in radiant heating system to reinforcing bars or reinforcing mesh of the type commonly used as structural reinforcement in concrete slabs that embed the radiant tubing. Each clip fastener 18 has a body 20 that is initially straight and includes a pair of end legs 22 and 24 and a pair of center legs 26 and 28. The end legs 22 can be bent relative to the center legs at elbow joints 30. The two center legs 26 and 28 can be bent relative to one another about a central hinge joint 32. The free end of leg 24 is provided with an end block 34 having a passage 36. The opposite end leg 22 is provided with a block 38 having a projecting tab 40. When the tab 40 is inserted into the passage 36, a locking mechanism (not shown) serves to lock the end blocks 34 and 38 together. As shown in FIG. 4, the clip fastener 18 is then in the general shape of a square that may extend around the thin objects which it fastens together.

U.S. Pat. No. 5,819,374 to Chiles et al., provides a more detailed description of the clip fasteners 18, and reference may be made to such patent for a more detailed understanding of the construction and function of the clip fasteners. U.S. Pat. No. 5,819,374 is incorporated herein by reference.

Figure 7:
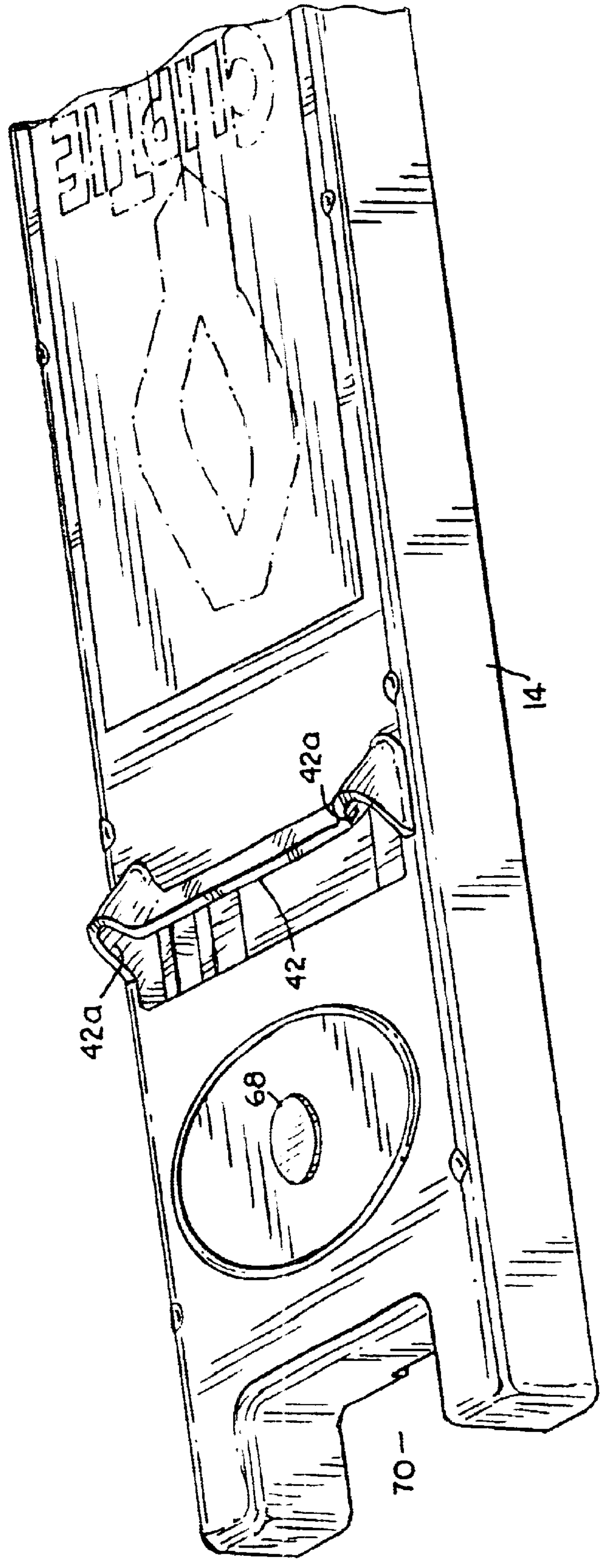
FIG. 7 is a fragmentary perspective view of the front portion of the head end of the applicator tool.

As best shown in FIG. 7, the head end portion of the front cover 14 is provided with a transverse loading slot 42 on its front surface. The loading slot 42 is large enough to receive the clip fasteners and provides an infeed opening that allows the clip fasteners 18 to be loaded into the applicator tool 10. The fasteners 18 are loaded in an orientation extending transversely to the front 14 (lengthwise relative to the transverse slot 42). The fasteners 18 may be produced in sets which are located side by side and which may include any suitable number in each set (4 per set, for example). A preselected number of the sets of clip fasteners may be loaded at a time, depending upon the capacity that is desired. For example, 20 sets may be loaded into the applicator tool 10 at any one time in accordance with one embodiment of the invention. The opposite ends of the slot 42 may include enlarged openings 42*a* for accommodating the enlarged end blocks 34 and 38 of the clip fasteners.

Figure 8:
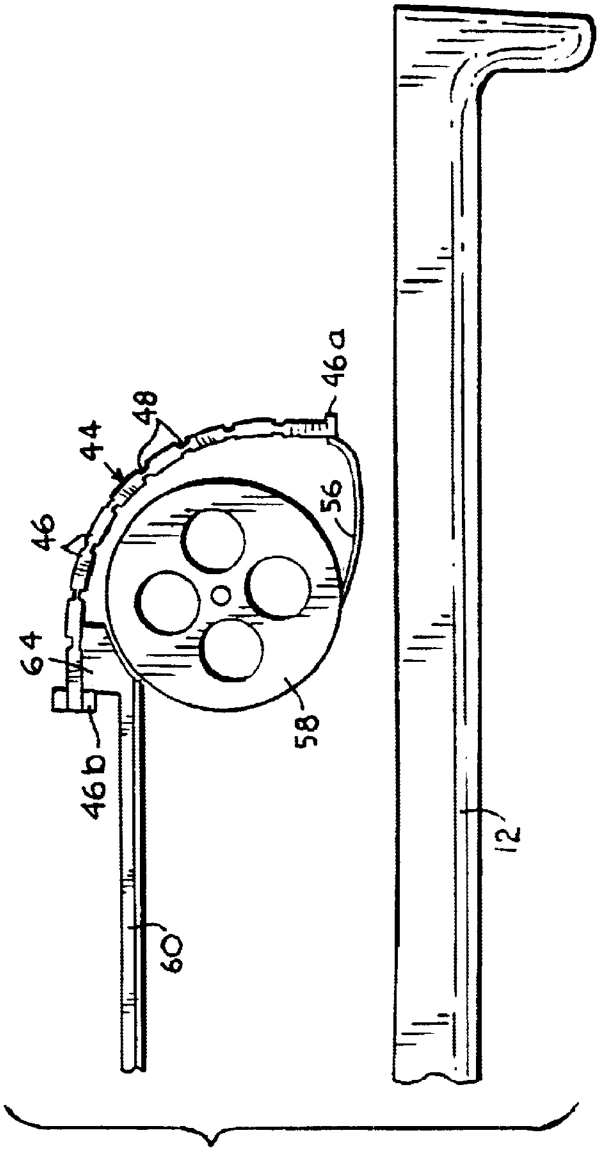
FIG. 8 is a diagrammatic side elevational view of a portion of the loading handle and the clip follower and winding drum that are included in the applicator tool.
Figure 9:
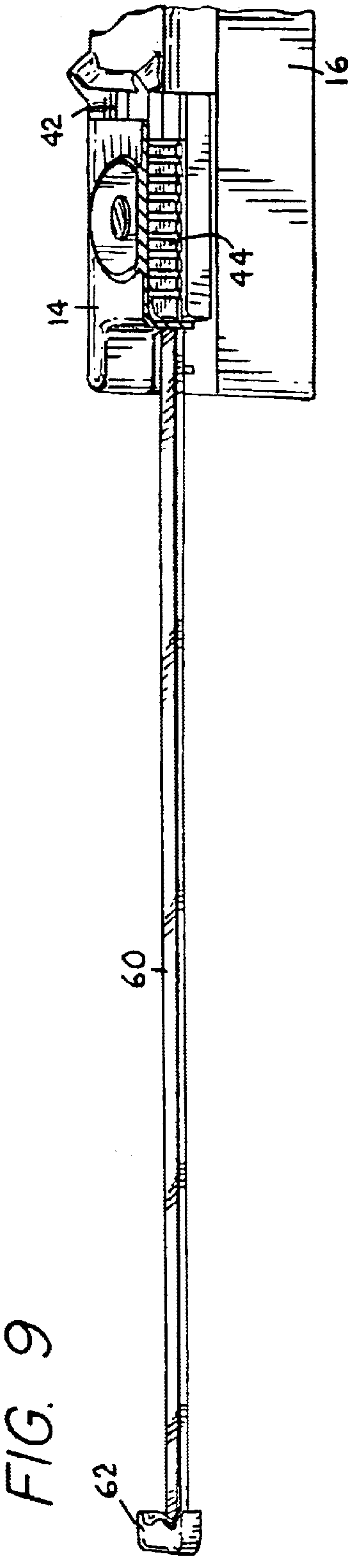
FIG. 9 is a fragmentary perspective view showing the loading handle fully retracted to allow loading of clip fasteners into the applicator tool.
Figure 10:
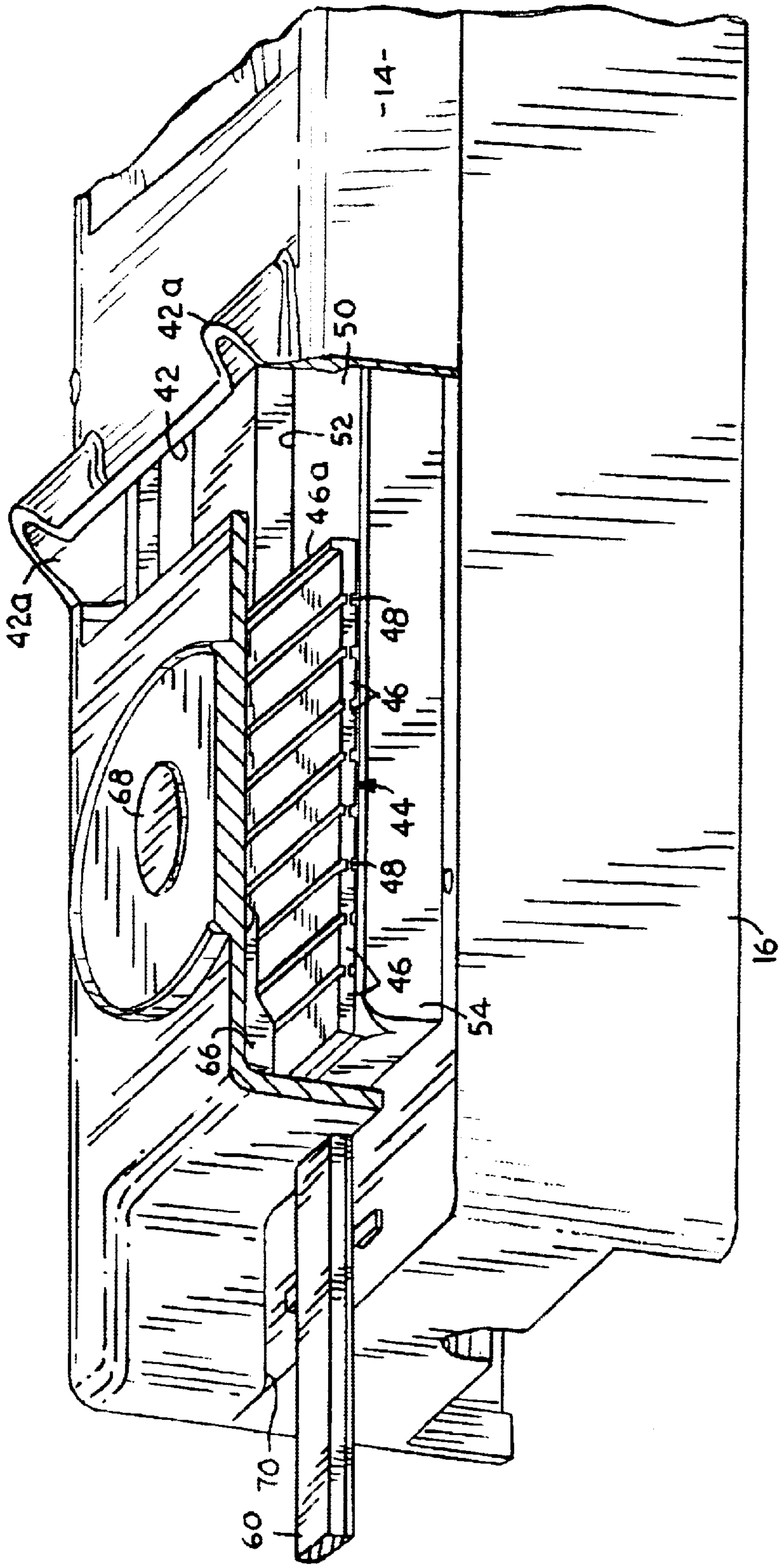
FIG. 10 is a fragmentary perspective view on an enlarged scale showing the clip follower latched in place by the loader catch of the applicator tool.

With reference to FIGS. 8–10 in particular, the clip fasteners 18 are fed toward the foot end of the applicator tool by a clip follower 44 which forms part of a feed mechanism. As best shown in FIG. 10, the clip follower 44 is constructed of a plurality of transverse slats 46 which are connected with one another by thin strips 48 that allow the slats 46 to bend relative to one another. The clip follower 44 rides on a flat guide surface 50 which is formed on the center section 16 and is provided with a central longitudinal groove 52 and upwardly projecting side flanges 54. The side flanges 54 engage the ends of the slats 46 to maintain the clip follower 44 in the desired orientation on the surface 50. The leading slat 46 has an upwardly projecting lip 46*a* on its forward end for pushing against the clip fasteners that are loaded into the applicator tool. The trailing slat 46 has on its back end a lip 46*b* (FIG. 8).

Referring to FIG. 8 in particular, a ribbon spring 56 is connected with the leading end of the clip follower 44 and is wound around a drum 58 which is mounted in the housing of the tool. The ribbon spring 56 is arranged in a coil such that it tends to wind itself up on the drum 58, thus exerting a force continuously pulling the clip follower 44 toward the foot end of the applicator tool. The loading handle 60 operates in the groove 52 and has a hand grip 62 on one end. The opposite end of the holding handle 60 is provided with a block 64 that interacts with the lip 46*b* on the clip follower 44.

The handle 60 can be retracted out of the housing to the fully retracted position shown in FIG. 9, and the block 64 then acts against lip 46*b* to pull the clip follower 44 to the head end of the applicator tool such that the clip follower is located past and clear of the slot 42 (to the left of the slot as viewed in FIG. 9). When the clip follower 44 has been fully retracted to this position, it is engaged and held in place by a catch 66 which is located immediately inside of the front cover 14. The body of the catch 66 presses downwardly against the trailing slats 46 in the clip follower in order to hold the clip follower in the fully retracted position. Then, clip fasteners can be loaded through the slot 42 and onto the surface 50 ahead of the clip follower. The catch 66 has a release button 68 which projects upwardly through an opening in the front cover 14 and which may be depressed in order to release the body of the catch 66 from the clip follower 44. Then, the clip follower is released and is pulled against the clip fasteners that have been loaded into the applicator tool due to the action of the ribbon spring 56.

Once the clip follower 44 has been fully retracted by the loading handle 60, the loading handle can be extended back into the housing of the applicator tool, and the handle 62 is then located in a recess 70 (FIG. 10) formed in the head end of the housing of the applicator tool.

Figure 11:
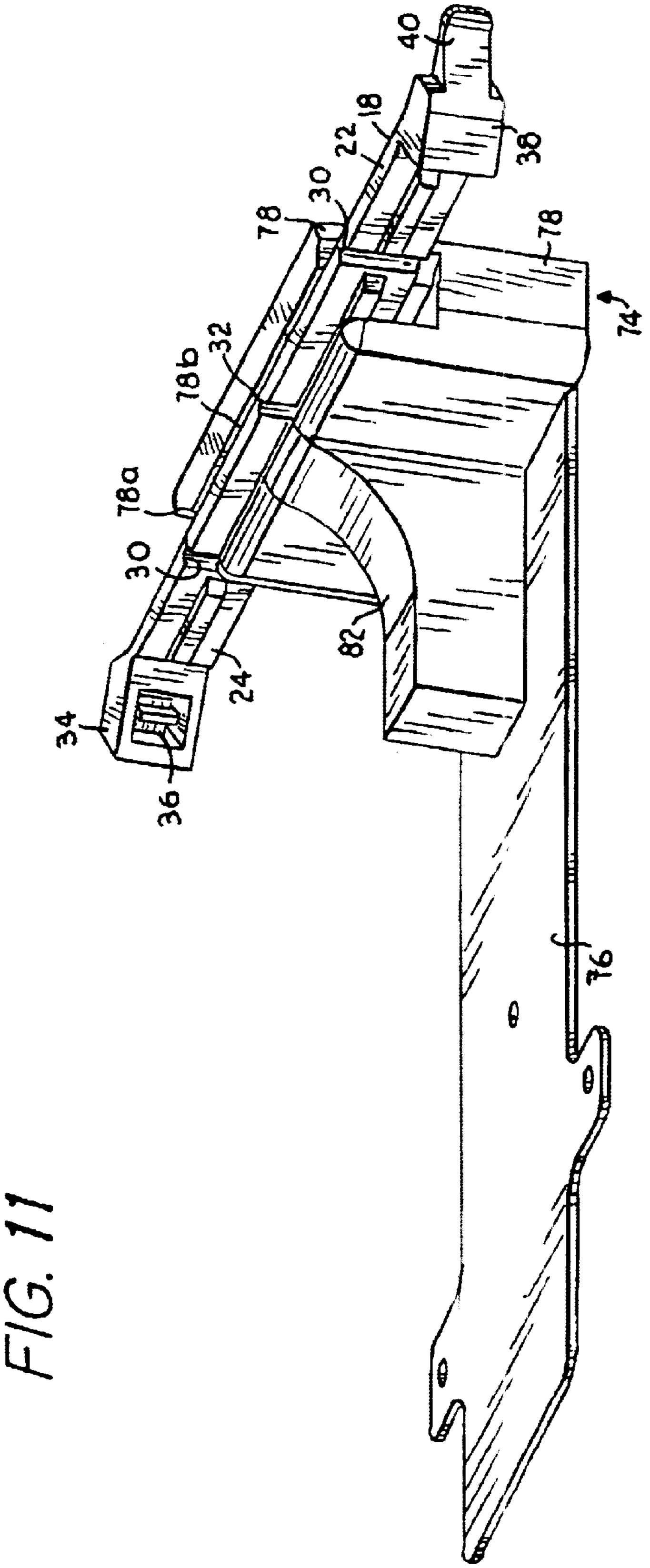
FIG. 11 is a perspective view on an enlarged scale showing one of the clip fasteners inserted into the slot of the receiver of the applicator tool.

The clip fasteners 18 that are delivered to the foot end of the applicator tool by the feed mechanism travel along a surface 72 (see FIG. 1) which curves away from the flat surface 50 and delivers the clip fasteners one at a time to a receiver 74. With reference in particular to FIG. 11, the receiver 74 has a flat mounting plate 76 which is secured to the underside of the back 12 and which functions in the manner of a leaf spring. At one end of the plate 76, the receiver includes a block 78 provided with an open slot 80 into which the clip fasteners 18 are delivered. Adjacent to the block 78, the receiver 74 has another block providing a curved ramp surface 82 that functions as a cam for deflection of the receiver, as will be explained more fully.

Figure 16:
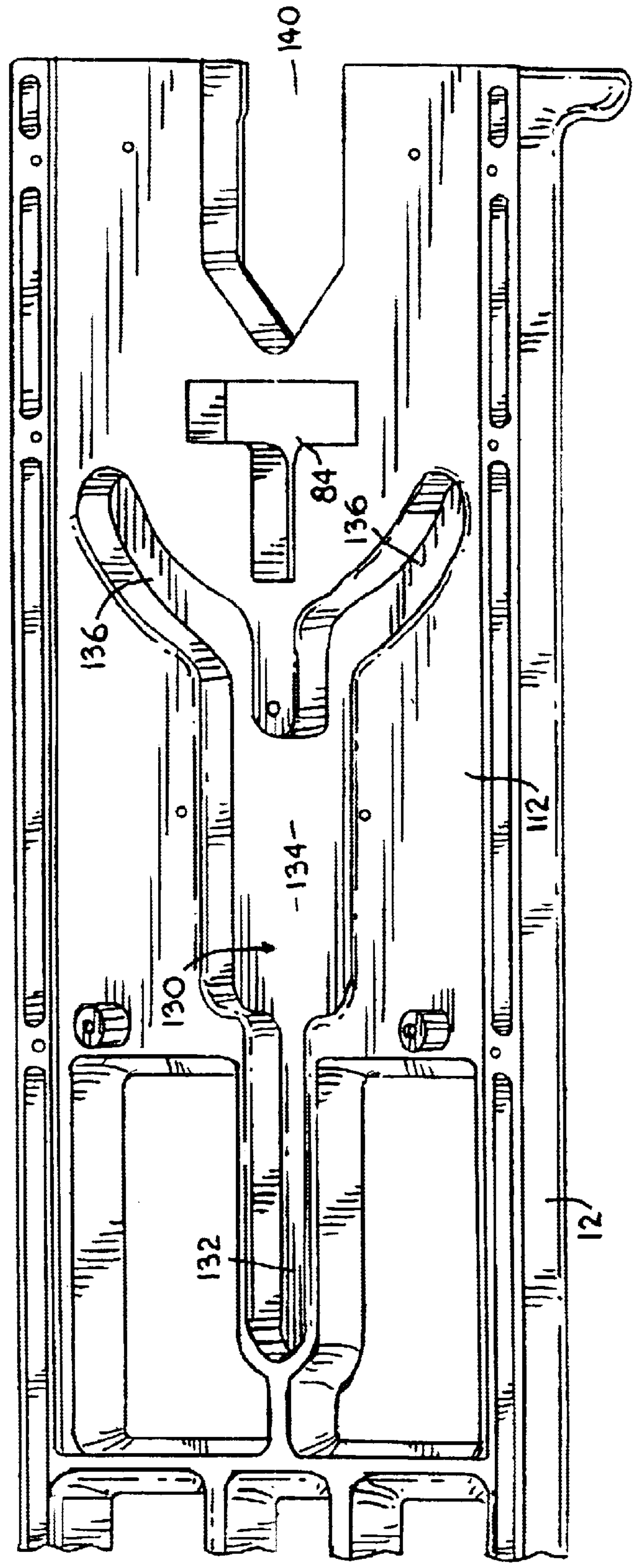
FIG. 16 is a fragmentary perspective view of the inside surface of the back of the housing of the applicator tool showing the pattern of slots and grooves that are formed in it.

The block 78 and ramp surface 82 normally project upwardly through a T-shaped slot 84 (FIGS. 1 and 16) which is formed through the back 12. The block 78 may be deflected rearwardly through the slot 84 against the spring force provided by the mounting plate 78. A small cover 86 is secured to the back 12 and covers the receiver 74 while allowing it to be deflected through the slot 84.

Figure 5:
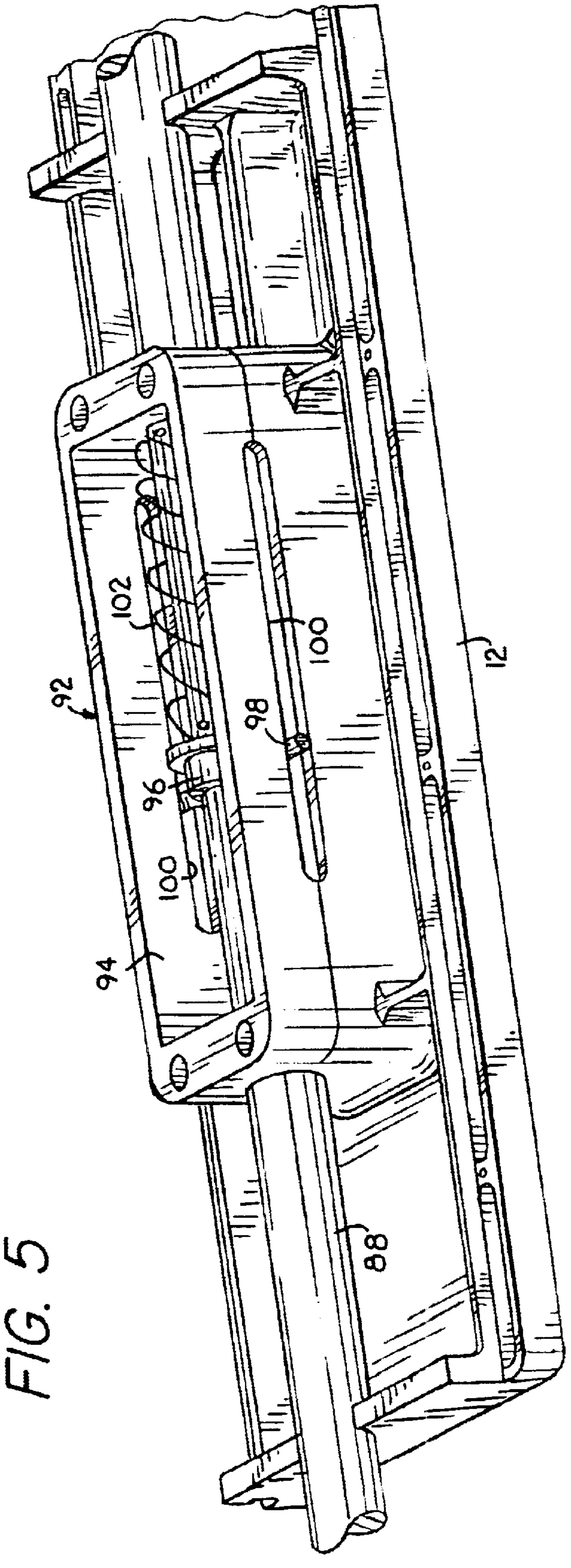
FIG. 5 is a fragmentary perspective view on an enlarged scale showing the spring box and a portion of the handle tube which form parts of the applicator tool.
Figure 6:
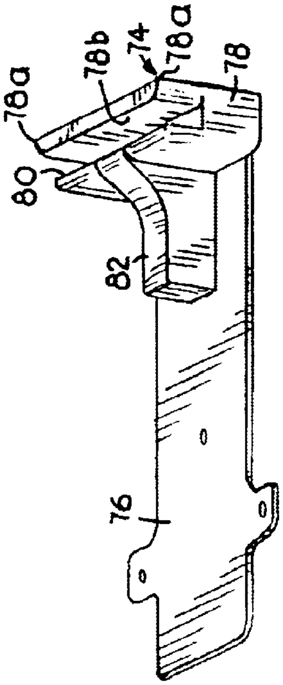
FIG. 6 is a perspective view of a receiver which forms part of the applicator tool.

As shown in FIG. 1, an actuating handle arrangement for the applicator tool includes a tube 88 having a hand grip 90 secured to one end. The tube 88 extends through and can slide relative to a small spring box 92 which is formed partly on the inside of the back 12 and partly by a handle cover 94, as shown in FIG. 5. A collar 96 is secured on the tube 88 at a location within the spring box 92. A transverse pin 98 extends through the collar 96 has its opposite ends received closely within slots 100 which are formed in the sides of the spring box 92. A compression spring 102 encircles the tube 88 and engages the collar 96 and one end of the spring box in order to continuously urge the tube 88 to the left as viewed in FIG. 5. The close fit of the pin 98 in the slots 100 prevents the tube 88 from rotating axially, and the ends of the slots 100 limit the travel of the tube 88 in both directions.

As shown in FIG. 1, the end of the tube 88 opposite the handle end is provided with a plate 104 that connects with a push plate 106. The push plate 106 forms part of a jaw mechanism which is included in the applicator tool.

Figure 13:
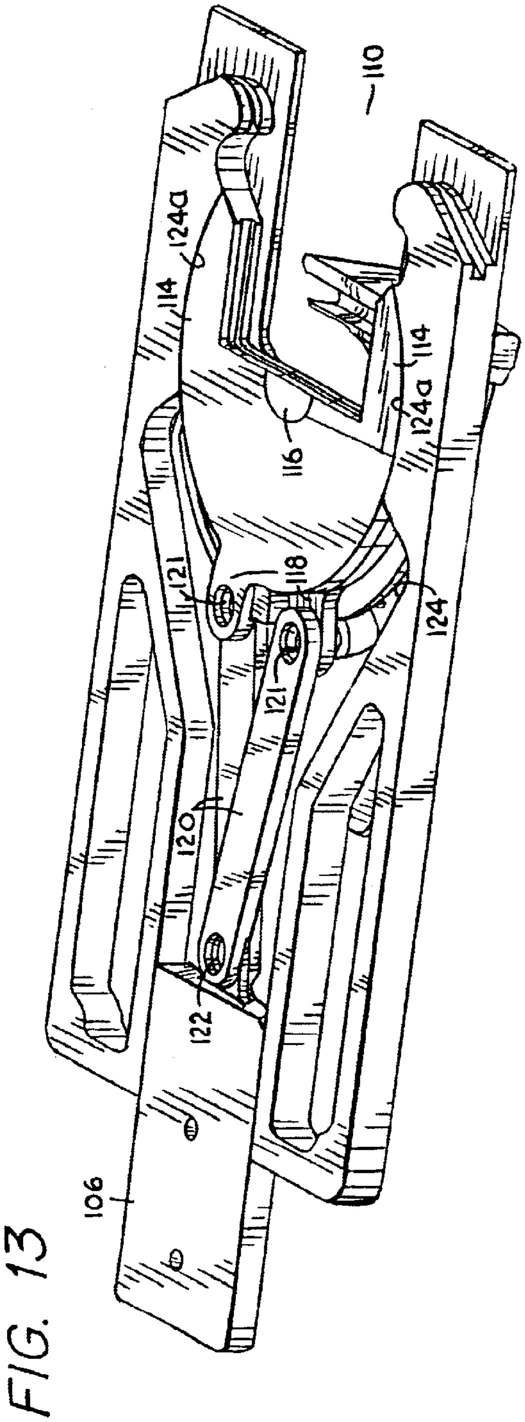
FIG. 13 is a fragmentary perspective view showing the joint mechanism advanced to deflect the receiver of the applicator tool, as occurs after the end legs of the clip fastener have been bent.
Figure 14:
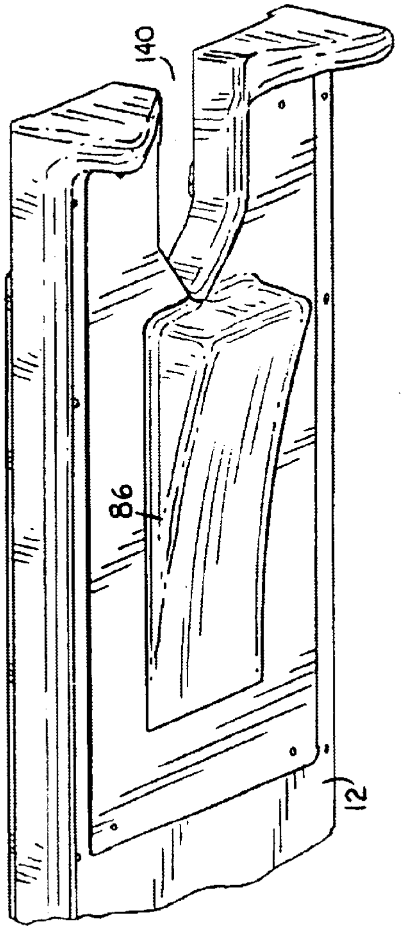
FIG. 14 is a rear perspective view of the foot portion of the applicator tool, showing the cover for the receiver.
Figure 15:
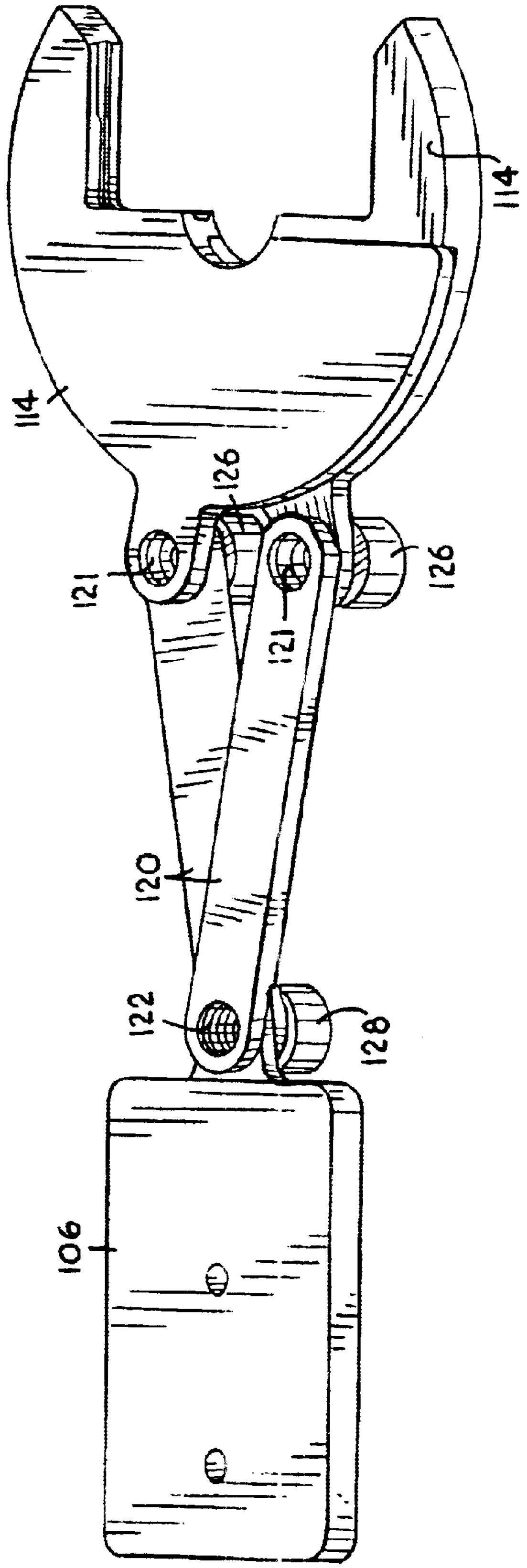
FIG. 15 is a perspective view of the jaw mechanism of the applicator tool.

With particular reference to FIG. 13, the jaw mechanism includes a jaw plate 108 having an end notch 110. The jaw plate 108 is received for back and forth sliding movement along a flat surface 112 (See FIGS. 1 and 16) formed on the inside of the back 12. The notch 110 normally overlies the T-shaped slot 84 such that the block 78 of receiver 74 normally projects through the notch 110.

With continued reference to FIG. 13 in particular, the jaw mechanism of the applicator tool includes a pair of jaws 114 which are connected for pivotal movement relative to one another about a pivot pin 116. The jaws 114 have projecting lugs 118, and the lugs 118 are pinned at 121 to the ends of arms 120. The opposite ends of the arms 120 are pinned to one another and to the push plate 106 by a pivot pin 122.

Figure 17:
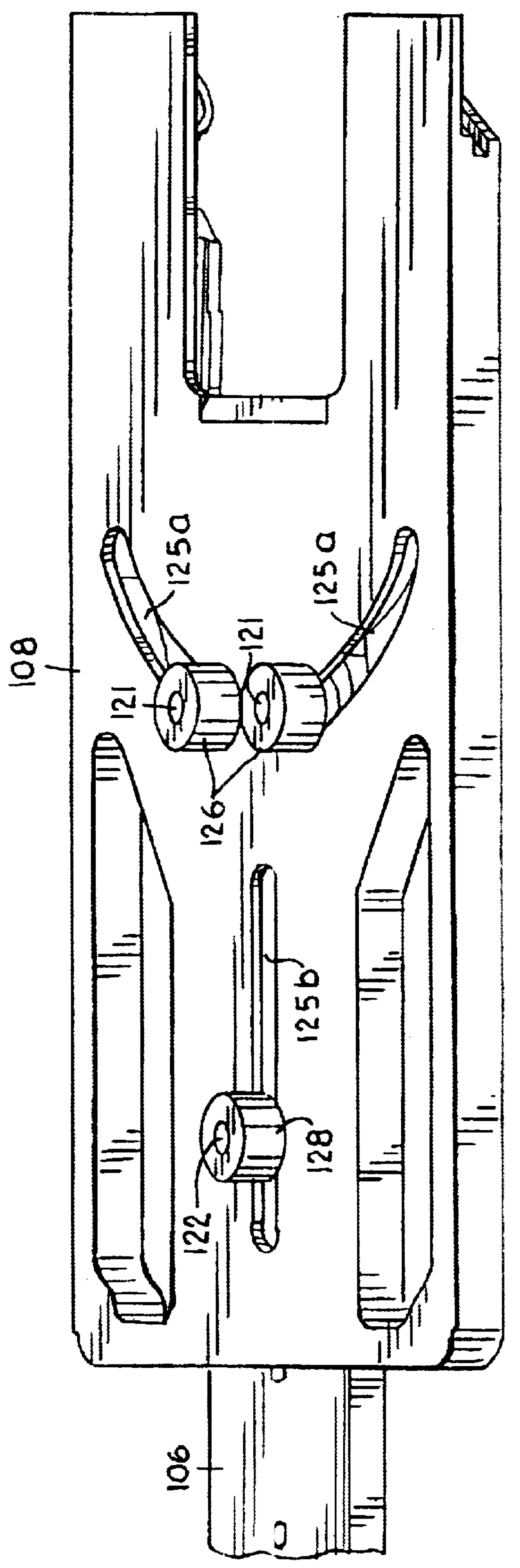
FIG. 17 is a fragmentary perspective view of the underside of the jaw plate that is included in the applicator tool.

The jaw mechanism is located in a groove or recess 124 which is formed in the jaw plate 108. The outer edges of jaws 114 are arcuate and fit closely in arcuate portions 124*a* of recess 124. The pivot pins 121 and 122 extend through slots 125*a* and 125*b* (FIG. 17) in the jaw plate 108. The ends of the pins 121 are provided with rollers 126, and the other pivot pin 122 is similarly provided with a roller 128. The rollers 126 and 128 are received in a recess 130 (FIG. 16) formed on the inside surface of the back 112. The recess 130 includes a straight end portion 132 in which roller 128 moves. Another straight but wider portion 134 of recess 130 is provided in its center. The rollers 126 move in portion 134 and also in curved tracks 136 which diverge away from one another at the end portion of the recess 130. The slots 125 coincide with the tracks 136.

Figure 12:
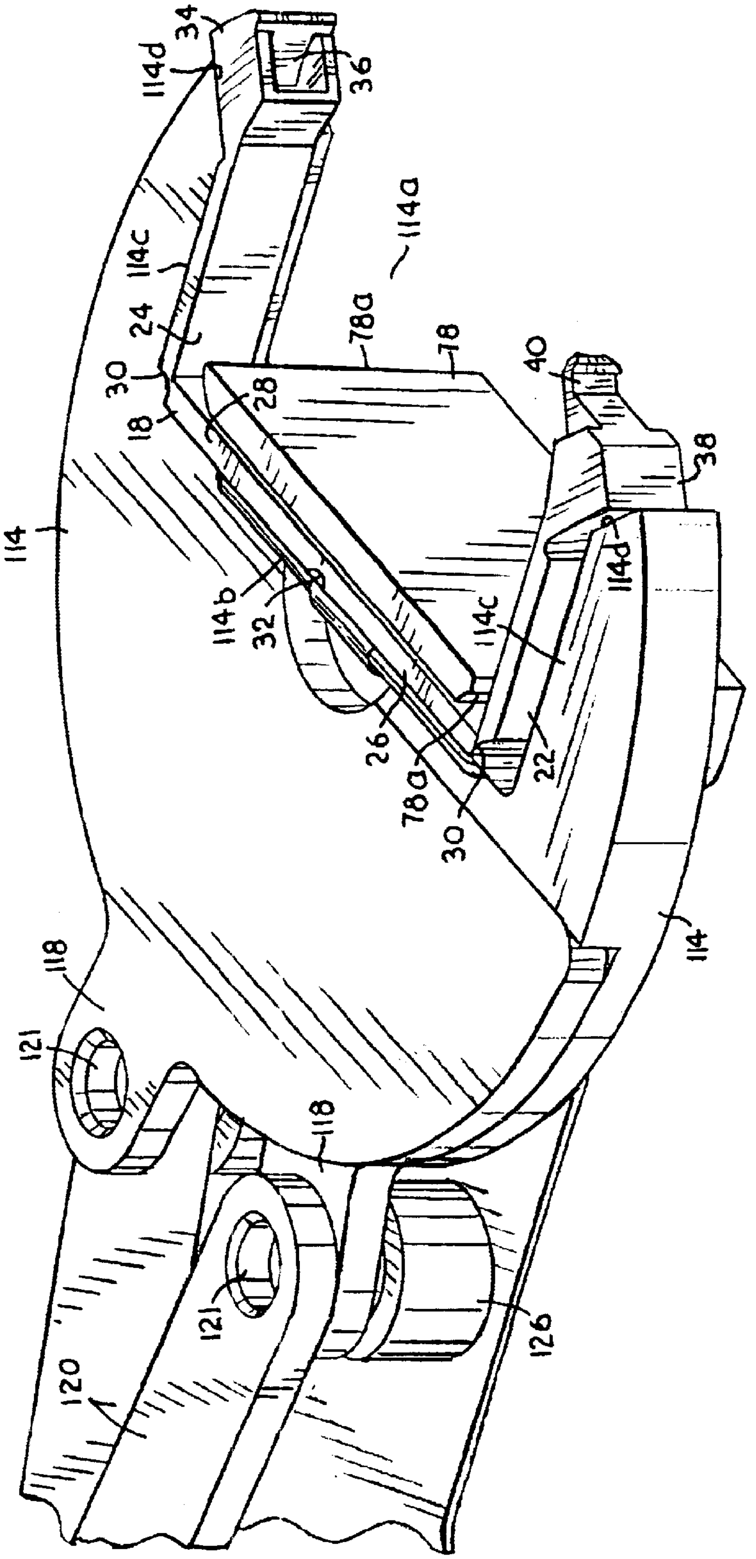
FIG. 12 is a fragmentary perspective view showing the bending jaws of the applicator tool applied to a clip fastener to effect bending of the end legs of the fastener about the two elbow joints of the fastener.

As best shown in FIG. 12, the jaws 114 cooperate to provide an open mouth area 114*a* in which the block 78 of the receiver 74 can be received. In the normal position of the jaws 114, they cooperate to provide a straight back 114*b* which is substantially the same length as the two center legs 26 and 28 of each clip fastener 18. The jaws provide within the mouths 114*a* straight opposite side edges 114*c* which are perpendicular to the back 114*b*. The jaws 114 terminate in angled ends 114*d* which are shaped to correspond with mating surfaces of the end blocks 34 and 38 of the clip fasteners 18.

Figure 20:
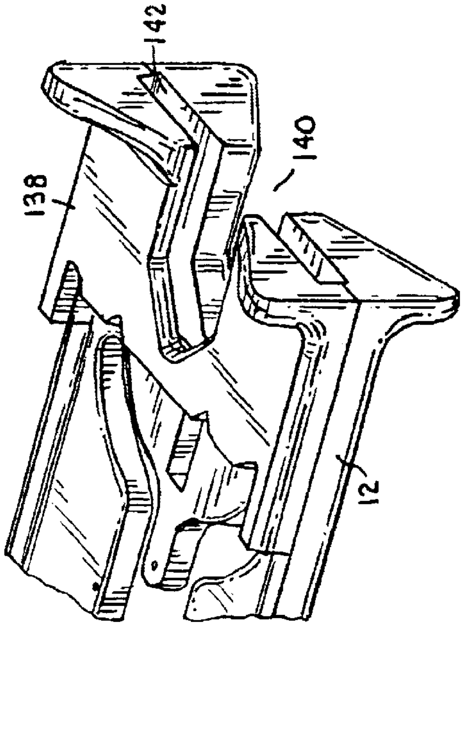
FIG. 20 is a fragmentary perspective view of the foot end of the applicator tool, with the center section and front removed for purposes of illustration.

As best shown in FIG. 20, a foot plate 138 is applied to the inside surface of the foot end of the back 12. The foot end of the back 12 and the plate 138 cooperate to provide an end notch 140 in the applicator tool for receiving the pieces that are to be fastened together by the clip fasteners. The foot end of the back 12 and the plate 138 also cooperate to provide a slot 122 for receiving the jaws 114 during the actuation stroke of the applicator tool.

In operation, the clip fasteners 18 are loaded into the applicator tool 10 with the loading handle 60 fully retracted to the position shown in FIG. 9. In this position, the loading handle 60 pulls the clip follower 44 to the head end of the device where it is clear of the loading slot 42 (see FIG. 10). The catch 66 acts to hold the clip follower 44 in this position, and the loading handle 60 can then be extended into the housing where it is out of the way.

The clip fasteners 18 may then be loaded into the applicator tool in group or sets. The groups or sets of clip fasteners are loaded through slot 42 in succession and are received on the flat surface 50 at a location ahead of the clip follower 44. When the applicator tool has been loaded to capacity or to the extent desired, the button 68 may be depressed to release the catch 66 from the clip follower 44. The force of the ribbon spring 56 urges the clip follower 44 against the trailing clip that has been loaded into the applicator tool, with the lip 46*a* engaging the trailing clip fastener 18 and urging all of the clip fasteners toward the foot end of the tool.

The feeding mechanism provided by the clip follower 44 and ribbon spring 56 delivers the clip fasteners along the surface 50, and the leading clip fastener travels along the curved surface 72 and is delivered into the slot 80 of the receiver 74. As shown in FIG. 11, the clip fastener 18 is positioned in the slot 80 with the hinge joint 32 centered in the slot 80 and the two elbow joints 30 located adjacent to the edges 78*a* formed on the sides of block 78 adjacent to the slot 80. The center legs 26 and 28 of the clip fastener 18 are positioned against a flat surface 78*b* which is formed on block 78 and faces into the slot 80.

In order to apply a clip fastener to thin objects which are to be fastened together, such as radiant hose which is to be fastened to reinforcing bar or wire mesh reinforcement, the applicator tool 10 is positioned with the objects to be fastened in the end notch 140. The handle 90 is then pushed into the housing from the position shown in FIG. 21A to the position shown in FIG. 21B. The push plate 106, the arms 122, and the jaws 114 are pushed by the tube 88 toward the foot end of the applicator tool. Due to the close fit of the jaws 114 in the recess portions 124*a*, the jaw plate 108 is slid along surface 112 toward the foot end of the tool. The projecting prongs adjacent to the tip surfaces 114*d* of the jaws act against the two end legs 22 and 24 of the clip fastener 18 and bend them about the elbow joints 30 as shown in FIG. 12. The elbow joints 30 are located adjacent to the edges 78*a* and are bent by the jaws about the fulcrums provided by the edges 78*a*. In this manner, the end legs 22 and 24 are bent such that they are perpendicular to the center legs 26 and 28 which remain at this time as a straight part of the clip fastener body 20.

Additional movement of the jaws 114 causes them to act against the cam surface 82 and thus deflect the block 78 downwardly as permitted by the mounting plate 76. The block 78 is deflected into the pocket provided by the cover 86 and is protected by the cover.

Figure 18:
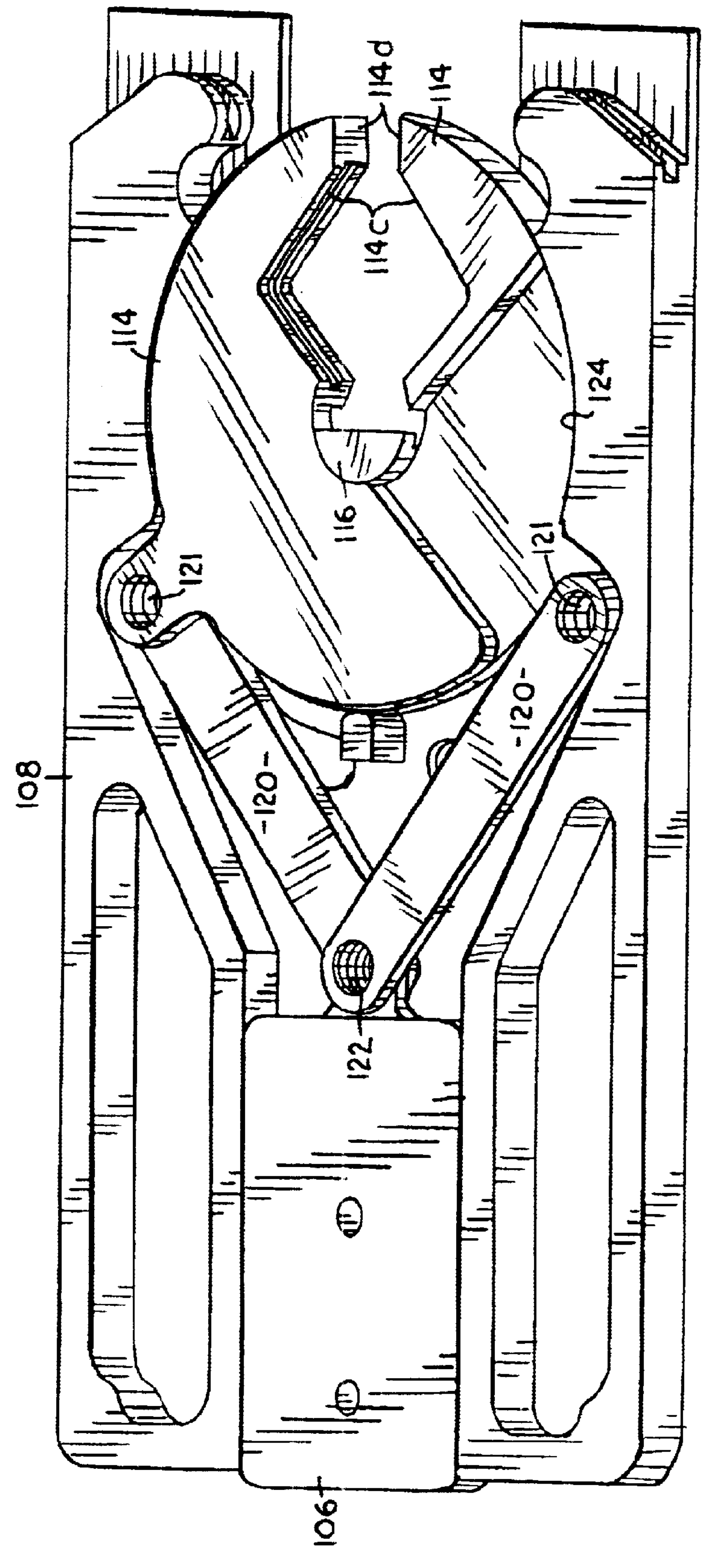
FIG. 18 is a fragmentary perspective view of the top of the jaw plate, with the jaw mechanism advanced to close the jaws for final bending of the clip fastener.
Figure 19:
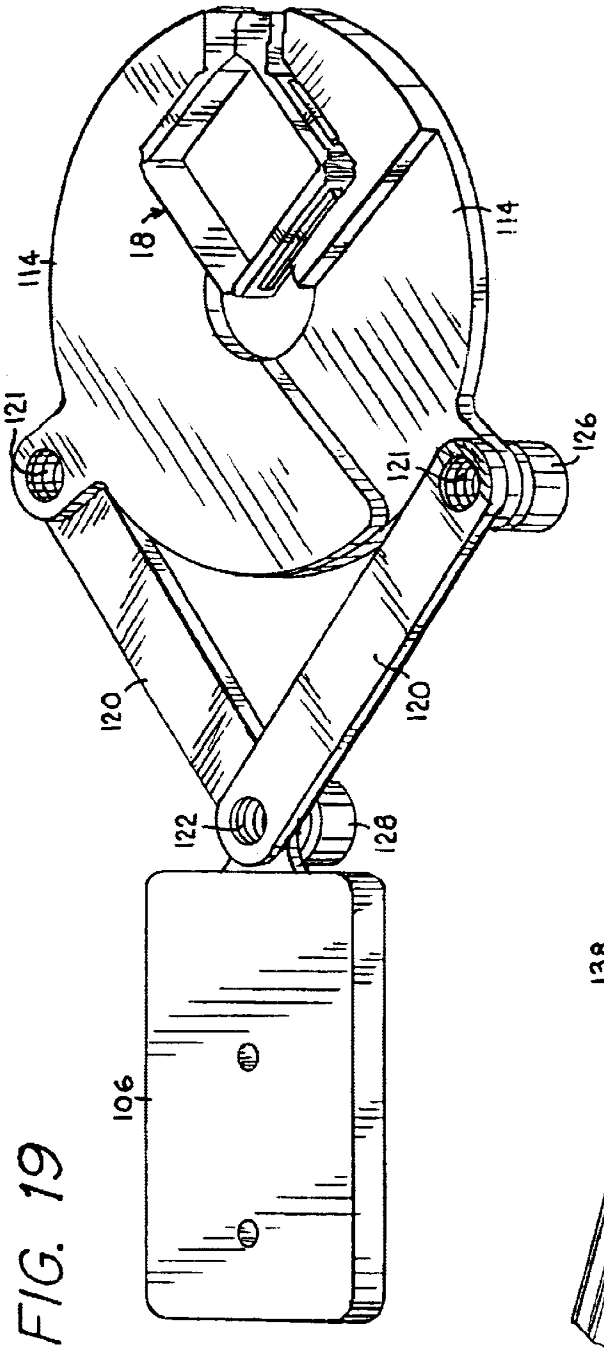
FIG. 19 is a perspective view showing the jaw mechanism fully closed to complete bending of one of the clip fasteners into a square shape with the ends connected together.

After the jaw plate 108 reaches the limit of its travel, additional movement of the push plate 106 causes the rollers 126 to enter the curved tracks 136. As the rollers 126 move away from one another in the tracks 136, the ends of the arms 120 likewise move away from one another, thus pivoting the jaws 114 closed about the pivot pen 116. As best shown in FIGS. 18 and 19, this pivotal closing of the jaws 114 effects bending of legs 26 and 28 about the hinge joint 32 of the clip fastener and forms the clip fastener into a generally square shape, bringing the end blocks 34 and 38 together with the tab 40 entering and being locked in the passage 36 to secure the clip fastener around the objects that are to be fastened.

The handle 90 can then be released, and the spring 102 acts against the collar 96 to force the tube handle 88 out of the housing to the position shown in 21A. The applicator tool is then in a condition to be applied for the fastening of additional objects together. The next clip fastener 18 is delivered by the feed mechanism into the slot 80 of the receiver 74 so that it is positioned to be bent by the jaw mechanism and tied around the next objects that are to be fastened together.

Figure 21A:
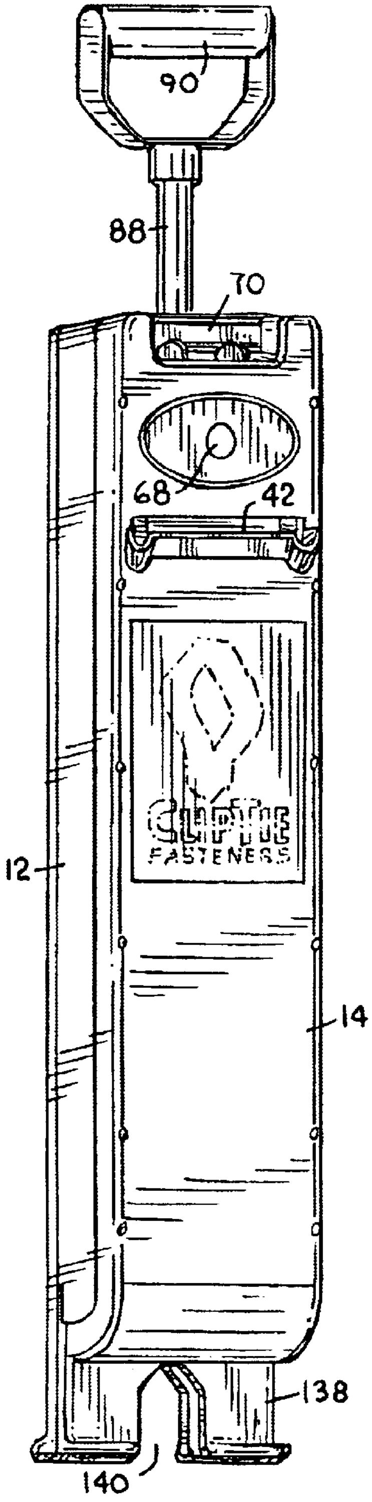
FIG. 21A is a perspective view of the applicator tool showing the applicator handle retracted.
Figure 21B:
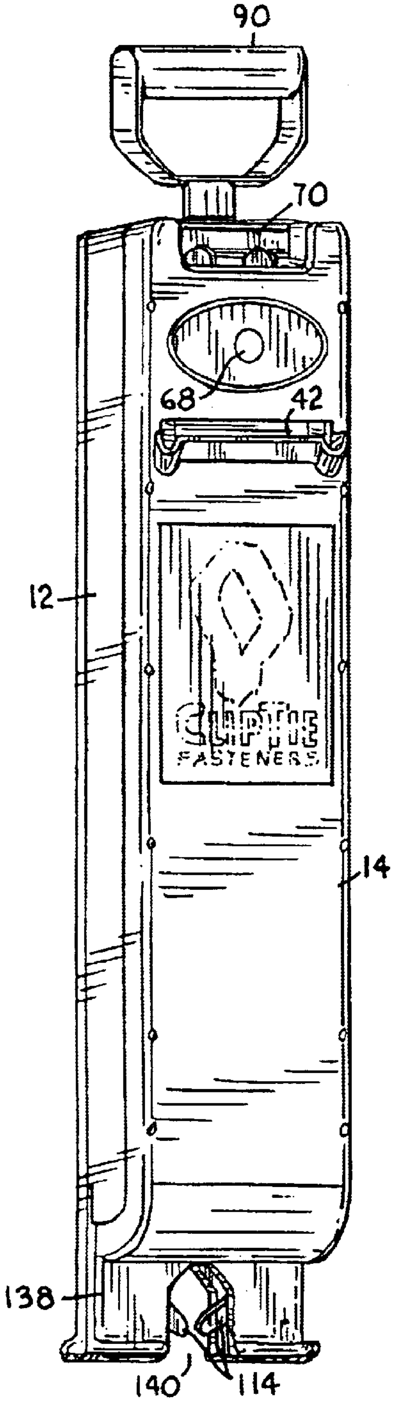
FIG. 21B is a perspective view similar to FIG. 21A, but with the handle fully extended into the housing to actuate the jaw mechanism for application of a clip fastener.
Figure 23:
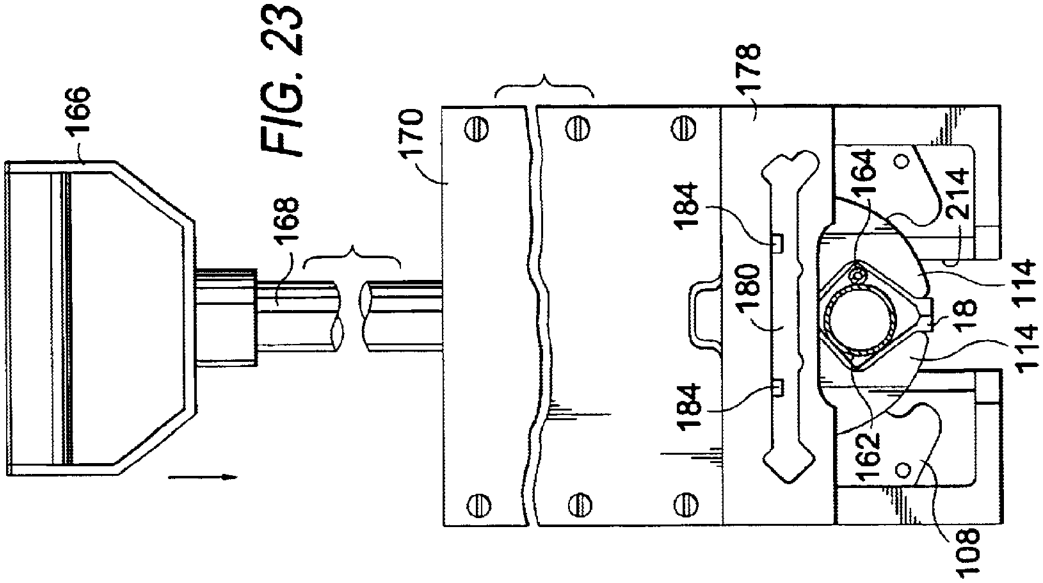
FIG. 23 is a front elevational view on an enlarged scale of the applicator tool of FIG. 22, with the jaw mechanism advanced to apply a clip fastener and the break lines indicating continuous length.

The foot plate 138 cooperates with projecting feet on the end of the back 12 to provide a stable base for supporting the application tool on a support surface, as shown in FIGS. 21A and 21B.

As an alternative to manual actuation of the tool, the tool can be equipped with a power actuation system such as a pneumatic cylinder or other power actuator that serves to effect successive operating strokes or cycles of the tool.

FIGS. 22–29 depict an alternative embodiment of the applicator tool which differs from the other embodiment primarily in its size and form and in the feeding mechanism which delivers the clip fasteners 18 to a position to be applied by a jaw mechanism. The applicator tool shown in FIGS. 22–29 is generally identified by numeral 160 and is used to apply the clip fasteners 18 in a manner to secure thin objects together, such as in securing radiant heating hose 162 to reinforcing wire 164 or other reinforcing material such as reinforcing bars.

Figure 22:
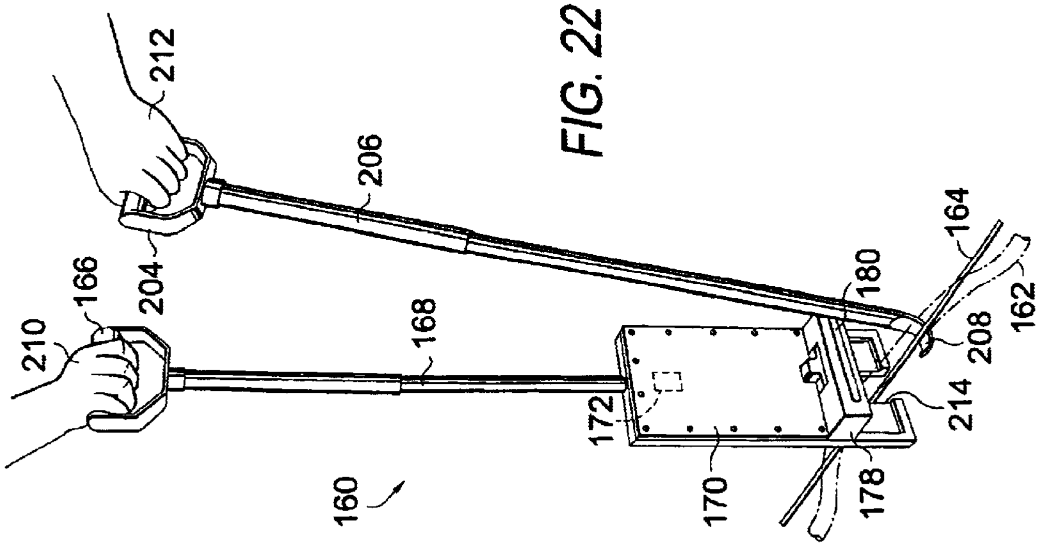
FIG. 22 is a perspective view showing a modified applicator tool being used with a hook end holding tool to secure radiant tubing to reinforcing mesh while the operator remains in a standing position.
Figure 25:
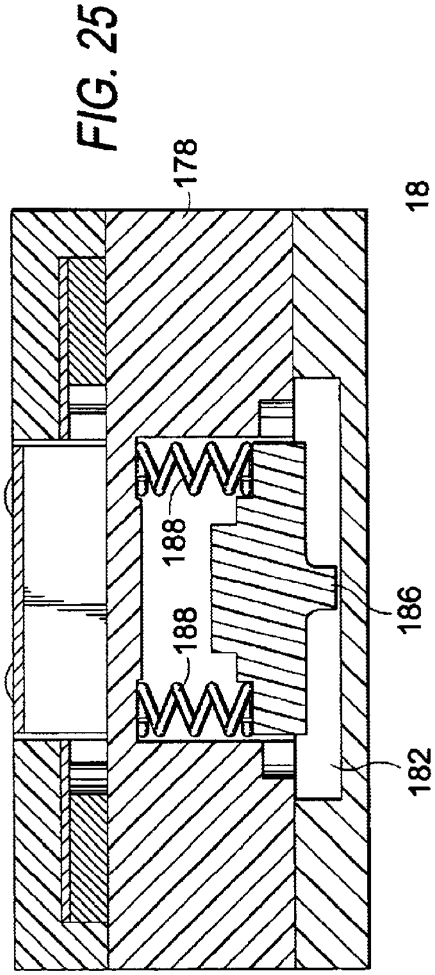
FIG. 25 is a sectional view taken generally along line 25—25 of FIG. 24 in the direction of the arrows.

The applicator tool 160 includes a handle 166 and a tube assembly 168 which extends into a box-like housing 170. The tube assembly 168 may be advanced in a direction to extend into the housing 170 but is urged in an opposite direction out of the housing by a spring 172 (FIG. 22). Within the housing 170, the tube assembly 168 connects with a jaw mechanism which may be of the same type described in connection with the embodiment shown in FIGS. 1–21. When the jaw mechanism is advanced into the housing 170, its jaws 114 (FIG. 23) pivot to a closed position in order to apply one of the fasteners 18 around the tube 162 and the reinforcing wire 164.

Figure 26:
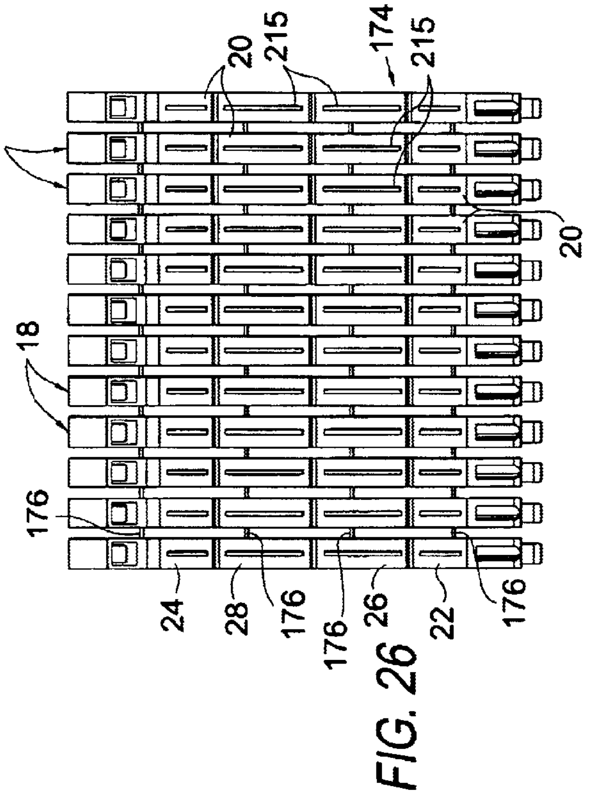
FIG. 26 is a front elevational view of a sheet of clip fasteners connected in accordance with the present invention.
Figure 24:
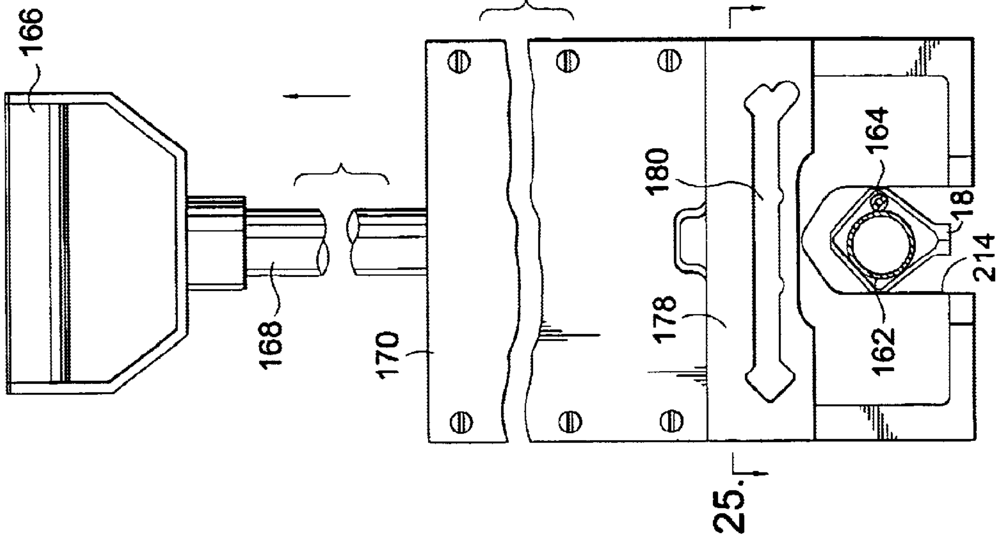
FIG. 24 is an elevational view similar to FIG. 23, but with the jaw mechanism retracted after a fastener has been applied.

With reference to FIG. 26 in particular, the fasteners 18 that are used with the applicator tool 160 are preferably arranged in a substantially flat sheet 174 in which the bodies 20 of the fasteners are connected side by side. In each sheet, the adjacent fastener bodies 20 are connected by a plurality of frangible connecting pins 176. One pin 176 extends between the corresponding end legs 22 of adjacent fasteners 18, and another pin extends between the corresponding end legs 24 of the same fasteners. Two additional connecting pins 176 extend between the corresponding center legs of adjacent fastener bodies and the other center legs 28. Thus, each fastener body 20 is connected with the adjacent fastener body by four of the frangible connecting pins 126 which hold the fasteners 18 in a manner to maintain the sheet 174 in a substantially flat condition. Each of the sheets 174 can include virtually any desired number of fasteners 18.

A block 178 is secured to the housing 170 and is provided with an irregularly shaped loading slot 180 for receiving the fasteners 18 in the sheet 174. The slot 180 extends through block 178 to intersect with a chamber 182 in which the jaw mechanism operates. Within slot 180, a pair of leaf springs 184 (FIG. 23) are mounted in order to urge the fasteners 18 toward the front portion of the slot which is the portion away from the tube assembly 168.

Figure 27:
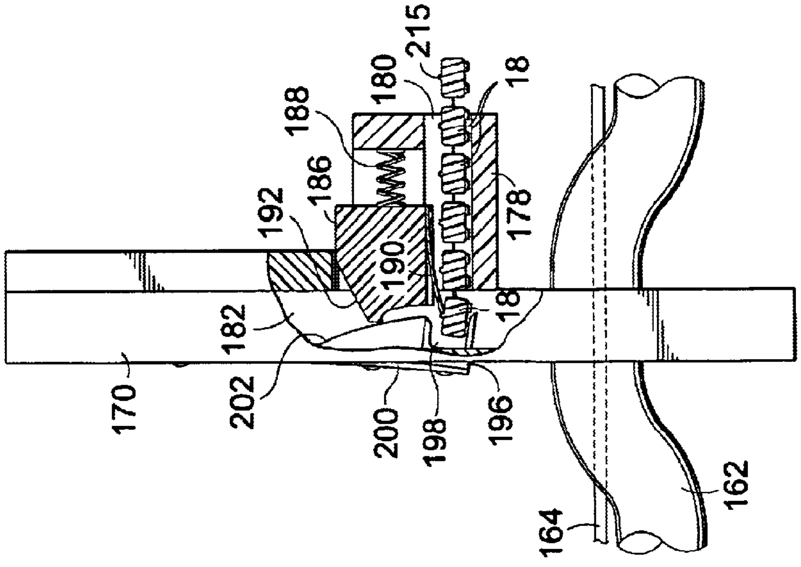
FIG. 27 is a side elevational view, partially in section, showing the applicator tool of FIGS. 22–25 applied to radiant tubing and reinforcing wire with the jaw mechanism retracted prior to application of a fastener to the tubing and wire.

A piston 186 is mounted so that it can reciprocate in the block 178 in a manner to feed the fasteners 18 one at a time to a dispensing position which is the position shown for the leading fastener in FIG. 27. A pair of compression springs 188 fit between the piston 186 and the outside wall of block 178 in order to continuously urge block 186 inwardly toward the chamber 182.

One face of piston 186 is located adjacent to the fasteners 18, and this face is provided with a spring finger 190 which may take the form of a leaf spring mounted in a manner such that its free edge is continuously urged toward the fasteners 18 which are loaded in the slots 180. The side of piston 186 opposite the spring finger 190 provides a cam surface 192 which is angled at an acute angle relative to the axis along which piston 186 reciprocates between the positions shown in FIGS. 27 and 28.

When the leading fastener 18 in the sheet 174 is delivered by the feeding mechanism to the position shown in FIG. 27, it is received in a slot 198 which is formed in a block 196. The block 198 is carried on the free end of a spring plate 200 secured to the outside surface of the housing 170. The block 196 normally projects into chamber 182 through an opening in the housing 170 and is urged in a direction toward the fasteners 18 by the spring plate 200. Adjacent to the block 196 is a curved surface 202 which provides a camming surface for effecting movement of the block 196 away from the fastener 18.

As shown in FIG. 22, the applicator tool 160 may be used in conjunction with a holding tool that includes a handle 204 and a rigid tube assembly 206 extending from the handle. On the end of the tube assembly 206 opposite the handle 204, a curved hook is provided on the end of the holding tool.

In operation of the applicator tool 160, the operator may grasp the applicator tool handle 166 in one hand 210 and the holding tool in the other hand 212. While the operator remains in a standing position, he can apply the hook 208 to the tube 162 in order to hold it adjacent to the reinforcing wire 164. With the other hand 210, the operator can then apply the housing 170 such that an end slot 214 receives the tube 162 and wire 164.

While remaining in a standing position, the operator can advance handle 166 toward the housing 170 in order to advance the jaw mechanism toward the tube 162 and wire 164. As the jaw mechanism approaches the area where the loading slot 180 intersects with chamber 182, its leading edge comes into contact with both of the camming surfaces 192 and 202. The action of the jaw mechanism against surface 202 causes the spring plate 200 to yield so that the block 196 is forced out of the chamber 182 by the camming action provided by the jaw mechanism engaging the camming surface 202. The block 196 is thus retracted so that the leading fastener 18 is no longer held in the slot 198. The contact of the jaw mechanism against surface 192 likewise causes the block 186 to retract out of the chamber 182 to the position shown in FIG. 28. The leading fastener 18 is thus released from the slot 198 and the spring finger 190 so that the advancing jaws 114 can contact it and detach it from the sheet 174 by breaking the frangible connecting pins 176. The jaws 114 then close in the manner previously indicated to connect the fastener 18 around the tube 162 and wire 164 in the manner shown in FIGS. 23 and 28.

Figure 28:
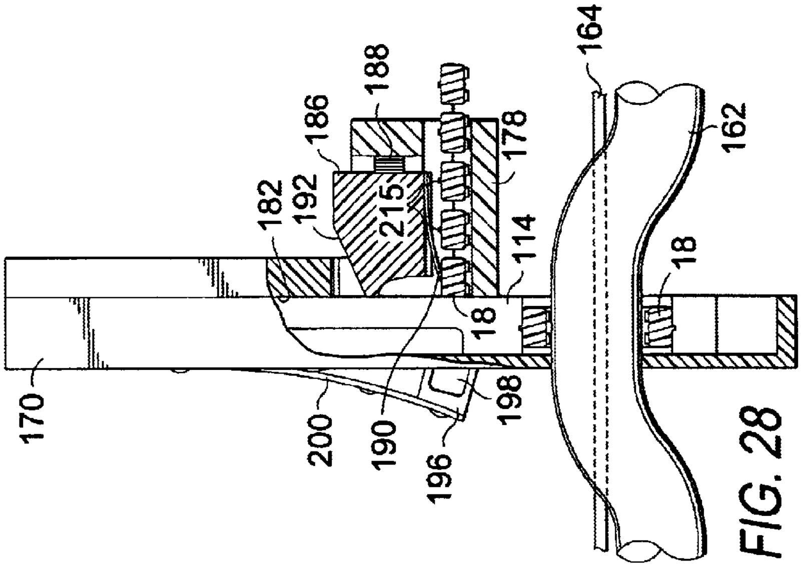
FIG. 28 is a side elevational view, partially in section, similar to FIG. 27 but with the jaw mechanism advanced to apply a fastener to the tubing and wire.
Figure 29:
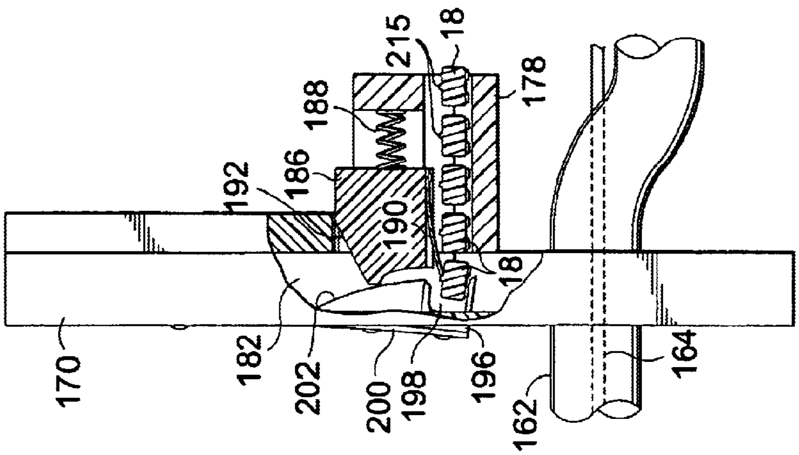
FIG. 29 is a side elevational view, partially in section, similar to FIGS. 27 and 28 but with the jaw mechanism retracted again after having applied a fastener to the tubing and wire.

Retraction of the block 186 to the position shown in FIG. 28 causes the free edge of the spring finger 190 to fit against ribs 215 on the center legs 26 and 28 of the next fastener which has now become the leading fastener on the sheet 174, as shown in FIG. 28. The springs 188 are compressed, but the jaw mechanism interferes with movement of the block 186 back into the chamber 182 until the jaw mechanism is retracted.

After the fastener has been applied in the manner indicated, the operator releases the force on the handle 166, and the jaw mechanism is retracted by the action of the spring 172. Once the jaw mechanism has retracted past the block 196, the spring plate 200 causes the block to enter chamber 182 again where the slot 198 is in position to receive the next fastener. Once the jaw mechanism has cleared the block 186, the springs 188 advance block 186 back into chamber 182. As this occurs, the spring finger 190 acts against the ribs 214 of the leading fastener in order to advance it into the slot 198 in position to be applied to the tube and wire during the next stroke of the jaw mechanism. This is the position shown in FIG. 29.

In this manner, the fasteners 18 can be applied to the tube 162 and the wire 164 one at a time, with the feeding mechanism acting to automatically advance the leading fastener 18 in the sheet 174 into position to be applied during the next stroke of the jaw mechanism. It is noted that the applicator tool 160 can be used in conjunction with the hooked holding tool such that the operator can apply the fasteners 18 while remaining in a standing position and without the need to stoop in order to reach the tubing and wire located near floor level. It is also noted that the assembly of the fasteners 18 in the flat sheet 174 permits a large number of the fasteners to be applied before there is a need to reload fasteners into the loading slot 180.

The feeding mechanism which operates to feed the fasteners 18 in the embodiment shown in FIGS. 22–29 is advantageous in that it acts to pull the sheet into the tool rather than to push it as occurs in the embodiment shown in FIGS. 1–21. Pulling on the sheet 174 through the application of force to the leading fastener is less likely to lead to jamming of the machine than in the case where the trailing fastener or other parts of the sheet are pushed rather than pulled.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, what is claimed is:

1. An applicator tool for applying tie fasteners connected side to side in a sheet around objects that are to be fastened together, said applicator tool comprising:

a housing having an infeed opening for receiving the sheet and accommodating a leading tie fastener in the sheet at a selected position for application to said objects;

a jaw mechanism in said housing operable to detach said leading fastener from the sheet and apply said leading fastener around said objects in a stroke of said jaw mechanism, said jaw mechanism being retractable at the end of each said stroke; and a feed mechanism arranged to feed said leading fastener to said selected position while attached to said sheet and, after said leading fastener has been detached from the sheet and applied around said objects, to advance said sheet to situate the next fastener thereon in said selected position when said jaw mechanism is retracted at the end of each said stroke thereof.

2. An applicator tool as set forth in claim 1, wherein said feed mechanism includes:

a piston mounted in said housing for reciprocating movement between first and second positions, said piston being urged toward said first position; and a finger on said piston located to engage the leading fastener on the sheet when said piston is in the second position thereof and to advance said leading fastener to said selected position when the piston moves from said second position to said first position, said finger being displaced from said first position to said second position during each stroke of said jaw mechanism and returning to said first position when said jaw mechanism is retracted at the end of each stroke.

3. An applicator tool as set forth in claim 2, including a receiver presenting a slot in which the leading fastener is received when in said selected position.

4. An applicator tool as set forth in claim 2, including a cam surface on said piston against which said jaw mechanism acts during each stroke thereof to effect movement of said piston to the second position by camming action.

5. An applicator tool as set forth in claim 1, wherein said feed mechanism includes a pulling finger applicable to said leading fastener in a manner to pull said leading fastener to said selected position.

* * * * *